No. 777,138. PATENTED DEC. 13, 1904.
F. RAY.
CONDENSER SYSTEM.
APPLICATION FILED NOV. 18, 1903.
NO MODEL.
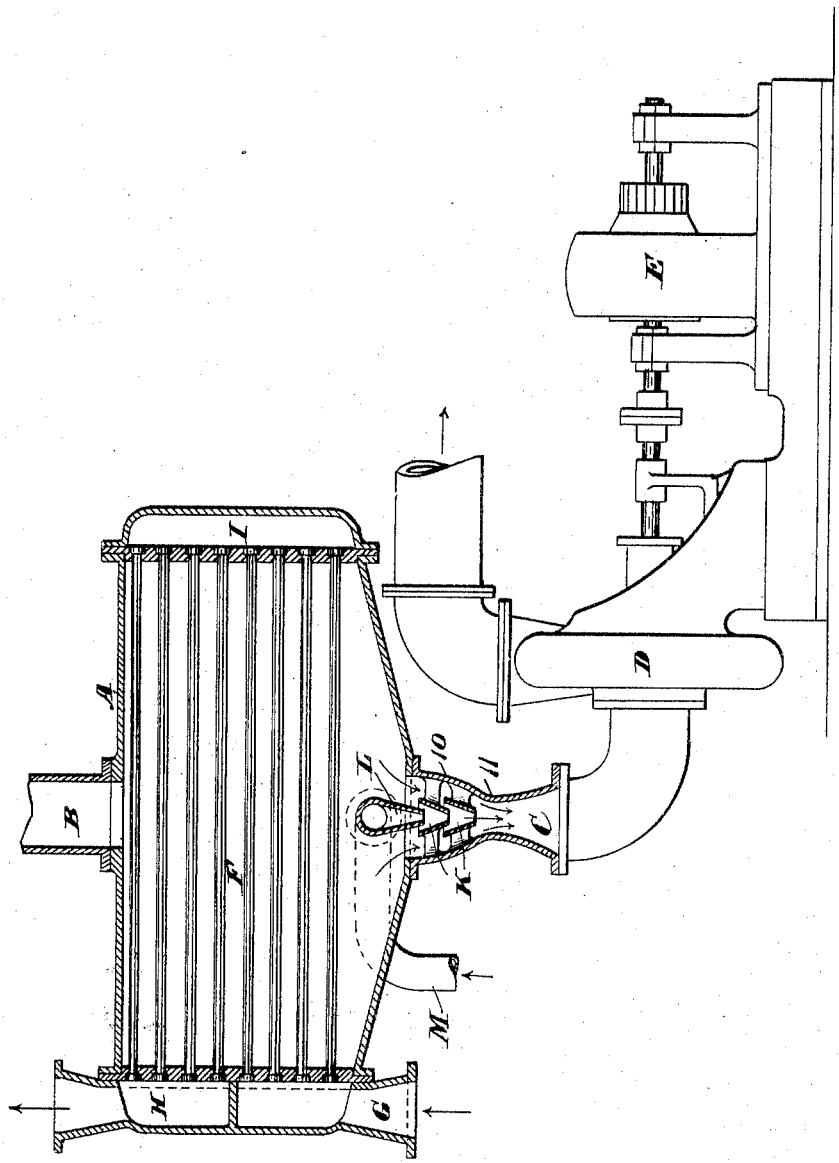
Attest:
Inventor:
Frederick Ray No. 777,138.

Patented December 13, 1904.

UNITED STATES PATENT OFFICE.

FREDERICK RAY, OF EAST ORANGE, NEW JERSEY, ASSIGNOR TO HENRY R. WORTHINGTON, OF NEW YORK, N. Y., A CORPORATION OF NEW JERSEY.

CONDENSER SYSTEM.

SPECIFICATION forming part of Letters Patent No. 777,138, dated December 13, 1904.

Application filed November 18, 1903. Serial No. 181,573. (No model.)

*To all whom it may concern:*

Be it known that I, FREDERICK RAY, a citizen of the United States, residing at East Orange, county of Essex, and State of New Jersey, have invented certain new and useful Improvements in Condenser Systems, fully described and represented in the following specification and the accompanying drawings, forming a part of the same.

The object of the present invention is to provide an improved condenser system of that class employing a surface condenser, and especially to provide a construction for efficiently removing the air and uncondensed vapors from the condenser with the water of condensation. I secure the result desired by combining with the surface condenser an injector so arranged in connection with the condenser discharge-pipe as to create sufficient suction to draw out from the condenser with the water of condensation the air and uncondensed vapors and secure a thorough and intimate mixture of the air and vapors with the discharge-water, so as to be delivered therewith. This broader feature of my invention may be used in connection with a pump or other apparatus of any class for withdrawing the water of condensation; but I preferably use a centrifugal or turbine pump, which secures the efficient delivery of varying amounts of water by a pump run at a constant speed and retains even the smallest amount of water, so as to keep the condenser clear, the thorough mixing of the air and uncondensed vapors with the water of condensation securing the efficient delivery of such air and uncondensed vapors by the centrifugal or turbine pump.

In the accompanying drawing, forming a part of this specification, the features of the invention are shown as applied in a simple preferred form, the condenser and injector being shown in vertical section and the delivery-pump in elevation.

In the drawing, A is the surface condenser, which is shown as a horizontal condenser, having the inlet B at the top for the exhaust-steam and the delivery-pipe C from the bottom of the condenser for the water of condensation, this delivery-pipe C communicating with the suction of the centrifugal or turbine pump D, which is shown as driven directly by a motor E. The condenser has the tubes F for the circulating or condensing water, which tubes open, respectively, into the inlet-chamber G and outlet-chamber H for the circulating or condensing water, these tubes connecting at one end of the condenser through the chamber I.

Referring now to the parts of the construction in which the invention is especially embodied, the delivery-pipe C, which receives the water of condensation, is shown as having the conical upper portion 10, forming a contracted outlet 11, and within this delivery-pipe are mounted two cone frustums K, forming with this delivery-pipe an injector of common form, the upper frustum K receiving the injection-water from the nozzle L, which is supplied through pipe M from any suitable source.

In the operation of the condenser the injector will act to draw out the air and other uncondensed vapors from the lower part of the condenser, where they collect on account of being heavier than the steam, and mix these with the water of condensation, so that they will be most efficiently removed by the centrifugal or turbine pump D, running at a constant speed.

By the term "surface condenser" used herein I mean a condenser of that class in which the steam passes into the condenser and is condensed therein by cooled surfaces and without mixing with the condensing-water as distinguished from condensers of that class in which the steam is condensed by mixing it with the condensing-water.

It will be understood that I have shown only one construction out of many that may be used to embody the invention and that all parts of the construction shown, including the injector, may be varied in form while retaining the invention claimed.

What I claim is—

1. The combination with a surface condenser, its steam-inlet and means for withdrawing the water of condensation, of a liquid-injector at the condenser-outlet for drawing off the air and uncondensed vapors from the condenser with the water of condensation.

2. The combination with a surface condenser, its steam-inlet and a centrifugal or turbine pump for withdrawing the water of condensation, of a liquid-injector at the condenser-outlet for drawing off the air and uncondensed vapors from the condenser with the water of condensation.

3. The combination with a surface condenser, its steam-inlet and means for withdrawing the water of condensation, of a liquid-injector in the lower part of the condenser for drawing off the air and uncondensed vapors from the condenser and mixing them with the water of condensation in the discharge-pipe.

4. The combination with a surface condenser, its steam-inlet and a centrifugal or turbine pump for withdrawing the water of condensation, of a liquid-injector for drawing off the air and uncondensed vapors from the condenser and mixing them with the water of condensation for delivery by the pump.

In testimony whereof I have hereunto set my hand in the presence of two subscribing witnesses.

FREDERICK RAY.

Witnesses:
C. J. SAWYER,
W. H. KENNEDY.